US005773184A

United States Patent [19]

Fuller, Jr. et al.

[11] Patent Number: 5,773,184

[45] Date of Patent: Jun. 30, 1998

[54] PROCESSING WHICH ENHANCES PHOTOCONDUCTIVITY OF TYPE I TITANYL PHTHALOCYANINE

[75] Inventors: Sterritt Ray Fuller, Jr.; Ronald Harold Levin, both of Boulder; Jennifer Kaye Neely, Arvada, all of Colo.

[73] Assignee: Lexmark International, Inc., Lexington, Ky.

[21] Appl. No.: 942,952

[22] Filed: Oct. 2, 1997

Related U.S. Application Data

[63] Continuation of Ser. No. 719,924, Sep. 25, 1996, abandoned.

[51] Int. Cl.$^6$ .............................. C09B 67/16; G03G 5/06
[52] U.S. Cl. .............................. 430/135; 430/78; 540/141
[58] Field of Search .................... 430/135, 78; 540/140, 540/141

[56] References Cited

U.S. PATENT DOCUMENTS

| | | | |
|---|---|---|---|
| 3,051,718 | 8/1962 | Wheeler | 260/314.5 |
| 4,298,526 | 11/1981 | Sappok et al. | 260/314.5 |
| 5,153,094 | 10/1992 | Kazmaier et al. | 430/135 |
| 5,166,339 | 11/1992 | Duff et al. | 540/140 |
| 5,189,156 | 2/1993 | Mayo et al. | 540/141 |
| 5,194,354 | 3/1993 | Takai et al. | 430/58 |
| 5,350,844 | 9/1994 | Martin et al. | 540/140 |

FOREIGN PATENT DOCUMENTS

| | | | |
|---|---|---|---|
| 0 221 466 A2 | 5/1987 | European Pat. Off. | C09B 67/04 |
| 976 055 A | 3/1951 | France | 14/2 |
| 195 05 784 A1 | 8/1996 | Germany | C09B 67/50 |
| 52 000 935 A | 1/1977 | Japan | C09B 19/04 |
| 2 275 687 | 9/1994 | United Kingdom | C09B 47/04 |

OTHER PUBLICATIONS

IS&T's Eleventh International Congress on Advances in Non–Impact Printing Technologies, Martin et al, pp. 30–35, 1995.

*Primary Examiner*—Christopher D. Rodee
*Attorney, Agent, or Firm*—John A. Brady

[57] ABSTRACT

Type I titanyl phthalocyanine is mixed with a solution of one part dihaloacetic acid and four parts methylene chloride by volume. This is then added to a solution of equal parts by volume of water and methanol, and the recovered phthalocyanine is washed. The resulting polymorph has improved photoresponsive speed. A photoconductor employing the polymorph can be an anodized aluminum drum having a coating of the polymorph in a resin binder, with a further coating of a known charge transport material in a resin binder.

9 Claims, No Drawings

PROCESSING WHICH ENHANCES PHOTOCONDUCTIVITY OF TYPE I TITANYL PHTHALOCYANINE

DIVISIONAL APPLICATION

This application is a division of application Ser. No. 08/719,924, filed Sep. 25, 1996 abandoned.

TECHNICAL FIELD

This invention relates to titanyl phthalocyanine used in a photoconductor, and, more specifically, to a process which improves the speed of response of photoconductors using Type I titanyl phthalocyanine.

BACKGROUND OF THE INVENTION

Both patent and journal literature contain many references to methods for preparing polymorphs of titanyl phthalocyanine. Some of the polymorphs are known to have significant response to light and can be used to advantage in photoconductor formulations, and other of the polymorphs are known not to be significantly photoconductive. Typically, these polymorphs are identified and differentiated from one another on the basis of their x-ray diffraction powder patterns (XRD patterns), a method widely used for such characterizations.

New polymorphs with significant photogenerating capabilities would be of technical interest and economic value for use in photoconductors in imaging applications. Various imaging applications call for different characteristics. For printing images which are either black or white, very fast discharge speeds are desirable, while more moderate speeds permit accurate rendition of shades of gray which may be required in some applications.

The methods to create such different polymorphs typically involve grinding or solvent treatments or both. U.S. Pat. No. 5,153,094 to Kazmaier et al describes such methods. This patent is one of several patents which disclose a process which creates a new and active polymorph of titanyl phthalocyanine through the specific use of a trihaloacetic acid in combination with other solvents. U.S. Pat. No. 5,194,354 to Takai et al describes the liquid procedures for forming of titanyl phthalocyanine, but none employing a haloacetic acid.

This invention employs dihaloacetic acid treatment of titanyl phthalocyanine. U.S. Pat. No. 3,051,718 to Wheeler discloses a dichloroacetic acid used for acid swelling of copper or metal free phthalocyanine. U.S. Pat. No. 4,298,526 to Sappok et al mentions mono and dichloroacetic acid used in milling phthalocyanine pigment, but not titanyl phthalocyanine.

Proceedings of ISPT's Eleventh International Congress on Advances in Non-Impact Printing Technologies, Martin et al, page 30, 1995 describe methods for producing enhanced sensitivity in Type I polymorphs, but those methods require an additional step; namely conversion of Type I material into Type IV material prior to regeneration of the improved Type I material. The extra step is not required by the present invention, and consumes extra time and resources without producing any extra advantage.

DISCLOSURE OF THE INVENTION

This disclosure employs solution treatment with dihaloacetic acid of Type I titanyl phthalocyanine to achieve a significantly more photoactive Type I titanyl phthalocyanine. The phthalocyanine is treated with a mixture of methylene chloride and a dihaloacetic acid. The Type I phthalocyanine is then recovered by addition to a water and methanol solution. The collected material is then washed and dried. The photoactivity of the material is greatly improved.

A photoconductor in which the foregoing phthalocyanine is suspended in a resin binder as a charge generation layer exhibits improved sensitivity and may be employed with a wide range of known charge transport layers.

BEST MODE FOR CARRYING OUT THE INVENTION

Improved photoactivity is obtained by starting with standard Type I polymorph of titanyl phthalocyanine and forming a mixture with dichloro- or difluoroacetic acid in methylene chloride in a ratio by volume of one part acid to four parts methylene chloride (i.e., $CHX_2CO_2H/CH_2CL_2$ at 1:4;X=Cl, F). This mixture is then added to a solution of equal parts by volume methanol and water (i.e., $CH_3OH/H_2$) at 1:1). The recovered Type I phthalocyanine is then washed with water followed by methanol. The XRD pattern of the recovered solid is indistinguishable from the starting Type I polymorph. However, a graph of voltage versus exposure energy shows a much faster response, with the recovered Type I phthalocyanine characteristics quite similar for both the dichloro and the difluoro acid treatments.

The difluoroacetic acid liquid (termed "pasting") procedure used to prepare this polymorph with enhanced photoactivity follows; the procedure using dichloroacetic acid is completely directly analogous.

Difluoroacetic Acid Pasting Procedure

Scale 20 g synthetic O=Ti[pc]

160 ml $CH_2Cl_2$ 40 ml Difluoroacetic acid 1000 ml MeOH 1000 ml deionized water Procedure 1. The pigment was treated with the solution of CH2Cl2 and difluoroacetic acid.

2. The above mixture was dropped via a dropping funnel into the stirring solution of water and methanol.

3. Once the addition of the foregoing mixture of O=Ti[pc] in methylene chloride and defluoracetic acid was completed, the resulting mixture was centrifuged at a setting of 3400 rpm for 10 minutes.

4. The supernatant remaining after centrifuging was poured off, the pigment was washed from the centrifuge tubes with water, and the water/pigment mixture was allowed to stir for approximately 10 minutes. This completes one washing with water.

5. The O=Ti[pc] was washed with water six times or until the supernatant pH was neutral.

6. One final washing was completed with methanol.

7. The O=Ti[pc] was allowed to dry in the vacuum oven.

The new polymorphs may be dispersed with polyvinylbutyral resin in a ratio by weight of two parts polymorph to one part resin (i.e., TiO[pc]/PVB=2:1) and this formulation is coated on a standard anodized aluminum conductive drum as conventional in making photoconductor drums. Then an active transport layer is coated on the TiO[pc]/PVB layer. The resulting coated drum is useful as a photoconductive imaging member. High photosensitivity accompanied by low dark decay occurs when the device is employed with a standard gallium arsenide laser. Specifically, in terms of voltage charge of the material and microjoules per square centimeter discharge: At 0 discharge, the standard was at about −850 volts and the new was at about −790 for the difluoro and about −760 for the dichloro; at 0.5 the standard was at about −700 and the new were at about −550; at 1 the standard was at about −640 and the new were at about −470; at 1.5 the standard was at about −620 and the two new were at about −440; and at 2 the standard was at about −610 and the new was about −420 for the difluoro and about −410 for the dichloro. Intermediate values appeared generally consistent with the foregoing values. Accordingly, a significantly larger discharge is experienced from the new polymorphs over the standard Type I polymorph.

A variety of polymers in addition to polyvinylbutyral are suitable for use in the charge generating layer. The transport layer is composed of a transport molecule such as a triarylamine, a hydrazone, a benzidine and other such materials dissolved in a solvent along with a polymer binder such as a polycarbonate, a polyester or other such materials.

Although pasting with trihaloacetic acid is known, as shown in the foregoing patent to Kazmaier, this has been considered quite specific. Entirely analogous pasting with pentafluoropropionic acid resulted in production of a different polymorph with minimal photoactivity and very different XRD pattern.

Accordingly, patent protection commensurate with this invention is sought as provided by law, with particular reference to the following claims.

What is claimed is:

1. A method for the preparation of a Type I polymorph of titanyl phthalocyanine having enhanced photoconductive properties consisting essentially of the steps of forming a mixture of Type I titanyl phthalocyanine with a solution of methylene chloride and a dihaloacetic acid, recovering said phthalocyanine by combining said mixture with a solution of water and alcohol, and washing said recovered phthalocyanine, said washed recovered phthalocyanine being a Type I polymorph of titanyl phthalocyanine.

2. The method as in claim 1 in which said solution in said forming step is by volume about one part of said acid and about four parts of said methylene chloride.

3. The method as in claim 2 in which said alcohol is methanol and said solution is equal parts by volume of said water and said methanol in said recovering step.

4. The method as in claim 3 in which said acid is difluoroacetic acid.

5. The method as in claim 3 in which said acid is dichloroacetic acid.

6. The method as in claim 2 in which said acid is difluoroacetic acid.

7. The method as in claim 2 in which said acid is dichloroacetic acid.

8. The method as in claim 1 in which said acid is difluoroacetic acid.

9. The method as in claim 1 in which said acid is dichloroacetic acid.

* * * * *